(12) United States Patent
Lee et al.

(10) Patent No.: US 11,156,534 B2
(45) Date of Patent: Oct. 26, 2021

(54) QUICK EXTRACTION KIT

(71) Applicant: Great Engineering Technology Corp., Kaohsiung (TW)

(72) Inventors: Chin-Shan Lee, Kaohsiung (TW); Wen-Jui Hsiao, Kaohsiung (TW)

(73) Assignee: GREAT ENGINEERING TECHNOLOGY CORP., Kaohsiung (TW)

( * ) Notice: Subject to any disclaimer, the term of this patent is extended or adjusted under 35 U.S.C. 154(b) by 856 days.

(21) Appl. No.: 15/961,009

(22) Filed: Apr. 24, 2018

(65) Prior Publication Data

US 2019/0293526 A1 Sep. 26, 2019

(30) Foreign Application Priority Data

Mar. 21, 2018 (TW) .................................. 107109676

(51) Int. Cl.
*G01N 1/34* (2006.01)
*G01N 30/14* (2006.01)

(52) U.S. Cl.
CPC ................ *G01N 1/34* (2013.01); *G01N 30/14* (2013.01)

(58) Field of Classification Search
USPC ....................................................... 73/863.23
See application file for complete search history.

(56) References Cited

U.S. PATENT DOCUMENTS

| | | | |
|---|---|---|---|
| 4,534,230 A * | 8/1985 | Courbon ............. | G01N 1/2205 73/863.23 |
| 9,581,579 B2 | 2/2017 | Lin | |
| 2006/0199275 A1* | 9/2006 | Togawa ............. | B01L 3/50825 436/177 |
| 2008/0233636 A1* | 9/2008 | Ryan .................... | G01N 1/2273 435/287.9 |
| 2010/0224012 A1* | 9/2010 | Modic ................... | G01N 30/14 73/863.23 |
| 2011/0197685 A1* | 8/2011 | Alburty ............... | G01N 1/4055 73/863.23 |
| 2012/0037126 A1* | 2/2012 | Bright .................... | F02D 41/20 123/476 |
| 2012/0152038 A1* | 6/2012 | Cho ........................ | G01N 1/44 73/863.12 |
| 2012/0297900 A1* | 11/2012 | Intelisano ............... | G01N 1/10 73/863.23 |

(Continued)

*Primary Examiner* — Peter J Macchiarolo
*Assistant Examiner* — Mohammed E Keramet-Amircolai
(74) *Attorney, Agent, or Firm* — Muncy, Geissler, Olds & Lowe, P.C.

(57) ABSTRACT

A the quick extraction kit includes a column and a cap. The column has an interior space to be filled with materials for extraction and cleanup. The column has at its top an opening and a flange, and at its bottom an lower tube. The lower tube has an outlet at its bottom. The cap has a base plate, an upper tube on the base plate, and a pair of reinforcing ribs. In particular, the base plate of the cap and the flange of the column together creates a sealing joint there between by spin welding. The upper tube of the cap is in communication with the column and has an inlet. Each of the reinforcing ribs has a bottom surface bonded with the top surface of the base plate, and an inner side surface adjacent to the bottom surface and bonded with a peripheral side surface of the upper tube.

15 Claims, 2 Drawing Sheets

(56) References Cited

U.S. PATENT DOCUMENTS

| | | | |
|---|---|---|---|
| 2015/0075302 A1* | 3/2015 | Jenkins | G01N 1/2205 73/863.23 |
| 2015/0185115 A1* | 7/2015 | Coleman | G01N 33/0044 73/863.23 |
| 2015/0377749 A1* | 12/2015 | Farina | G01N 1/2205 73/863.23 |
| 2016/0311643 A1* | 10/2016 | Tracey | B65H 75/4471 |
| 2018/0127740 A1* | 5/2018 | Morhet | C12N 15/1006 |

* cited by examiner

QUICK EXTRACTION KIT

BACKGROUND OF THE INVENTION

1. Field of the Invention

The present invention relates to a quick extraction kit for testing pesticide residues or veterinary drug residues, and more particularly to a quick extraction kit with a column.

2. Description of the Related Art

Pesticides or veterinary drug have been used worldwide. However, excessive use of pesticides or veterinary drug can be detrimental to the environment and to the food security at large. Maximum allowable levels of pesticide residues or veterinary drug residues in foods have been stipulated by regulatory bodies in many countries. At present, analysis and detection of the residues can be achieved by instruments, such as LC/MS-MS or GC/MS-MS, in the lab. Generally, a sample preparation may be needed for instrumental measurement, which involves an extraction and efficient cleanup process using a so-called QuEChERS ("Quick, Easy, Cheap, Effective, Rugged, and Safe") method. However, it may take hours for the sample preparation, which makes it difficult for use. To solve this problem, a quick extraction kit has been developed as disclosed in U.S. Pat. No. 9,581,579. However, the quick extraction kit of that patent has poor sealing performance, and the cap of the quick extraction kit can easily be falling off the column, and is fragile in structure.

SUMMARY OF THE INVENTION

To solve the aforementioned problems, the present invention provides a new quick extraction kit which has excellent sealing performance and is not durable in structure, and the cap of which can be secured on the column from falling off.

Briefly described, the quick extraction kit of this invention includes a column and a cap. The column has an interior space to be filled with materials for extraction and cleanup. The column further has at its top an opening communicating with the interior space and a flange surrounding the opening, and at its bottom an lower tube communicating with the interior space. The lower tube has an outlet at its bottom. On the other hand, the cap has a base plate for covering the opening of the column, an upper tube extending upward from a top surface of the base plate, and a pair of reinforcing ribs formed on the base plate and at opposite sides of the upper tube. In particular, the base plate of the cap and the flange of the column together creates a sealing joint therebetween by spin welding. The upper tube of the cap is in communication with the interior space of the column and has an inlet. Each of the reinforcing ribs has a bottom surface bonded with the top surface of the base plate, and an inner side surface adjacent to the bottom surface and bonded with a peripheral side surface of the upper tube.

Preferred embodiments of the invention may have the following additional characteristics, either alone or in combination:

The upper tube of the cap has a connecting portion. The column further includes at its bottom a coupling pipe surrounding the lower tube. The coupling pipe has an inner wall formed with an connecting portion. An annular gap is formed in between the inner wall of the coupling pipe and an outer wall of the lower tube. The connecting portion of the upper tube of the cap is configured in shape and size to match the connecting portion of the coupling pipe of the column in order to be engaged with a column of another quick extraction kit.

The connecting portion of the upper tube of the cap is an external thread, and the connecting portion of the coupling pipe of the column is an internal thread for engagement with the external thread. The cap may further include an annular cylindrical portion extending downward from a bottom surface of the base plate to be fit in the opening of the column. The column may further include an enclosing wall formed along the flange, and the base plate of the cap lies within the enclosing wall of the column. The column may further include a plurality of ribs at a bottom of the interior space and arranged in a circle surrounding an entrance of the lower tube. The lower tube of the column projecting outside the coupling pipe of the column.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
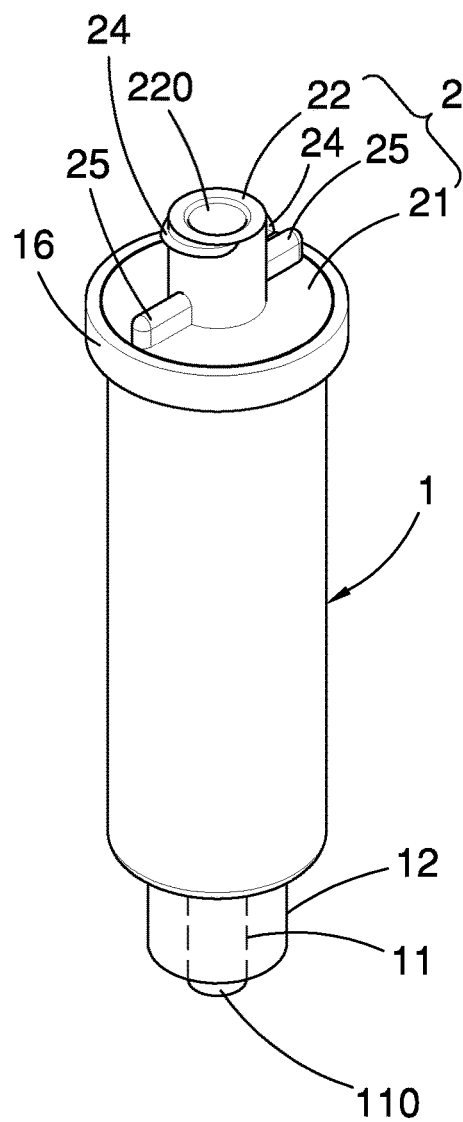
FIG. 1 is a perspective view of a quick extraction kit in accordance with one embodiment of the present invention.
Figure 2:
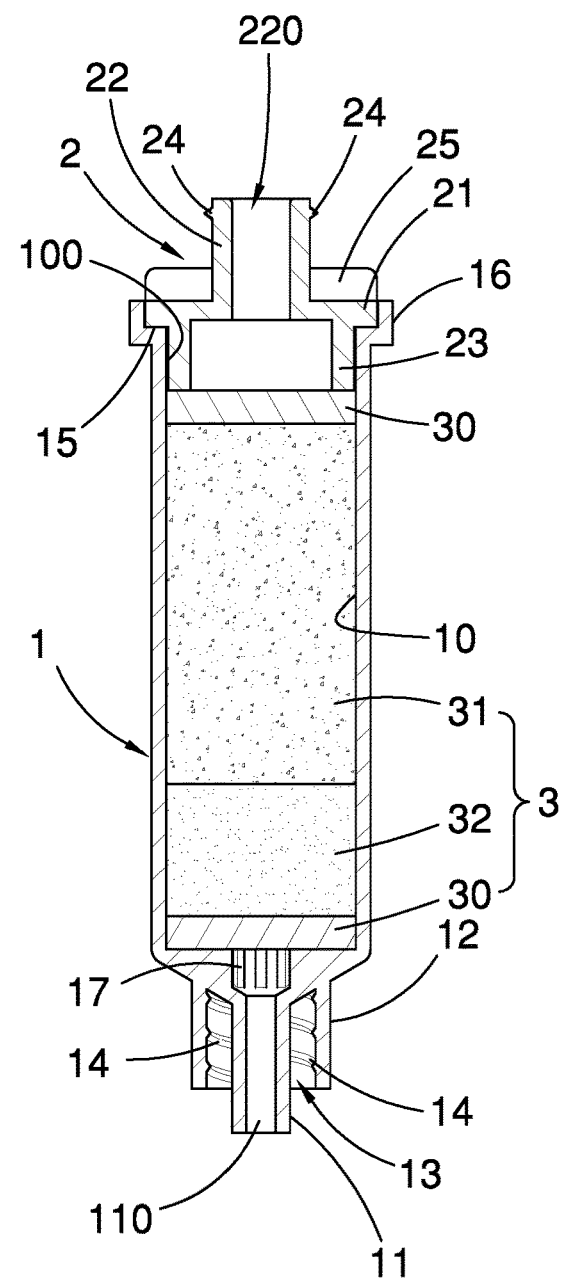
FIG. 2 is a cross-sectional view of the quick extraction kit shown in FIG. 1.
Figure 3:
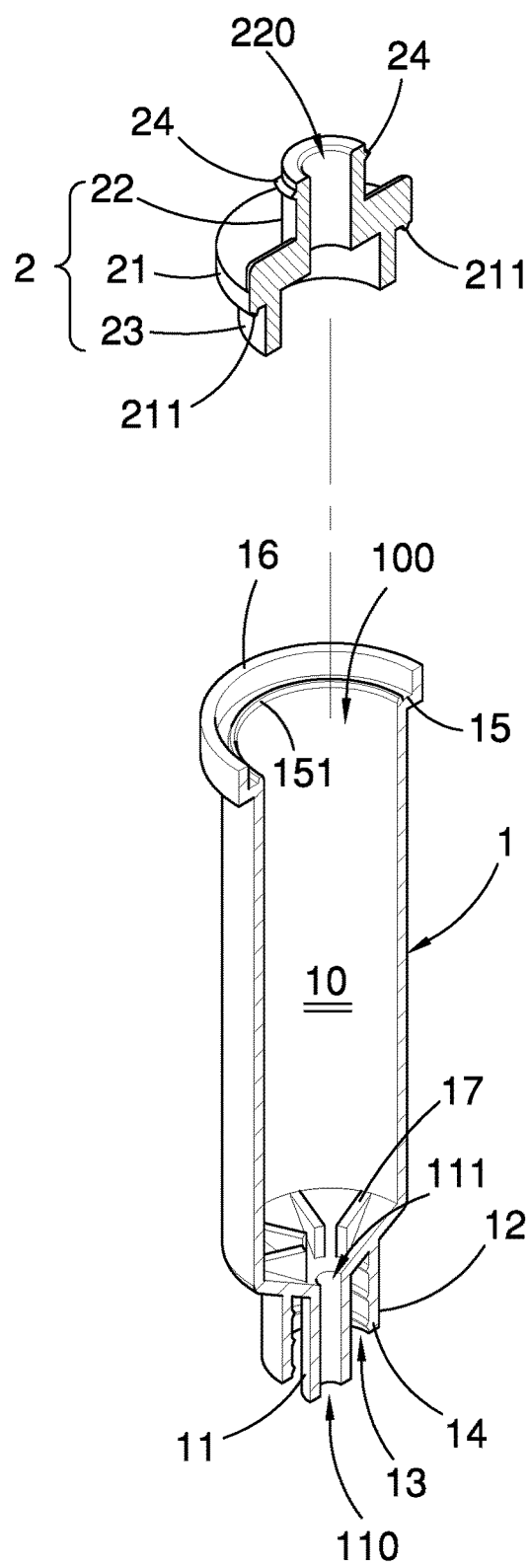
FIG. 3 is an exploded perspective view of the quick extraction kit shown in FIG. 1, partially cut away to show the details thereof.

Referring to FIGS. 1 through 3, there is shown a preferred embodiment of the quick extraction kit, comprising a column 1 and a cap 2. The column 1 has an interior space 10 and an outlet 110 at a bottom thereof. As depicted in FIG. 2, the interior space 10 is filled with materials 3 for extraction and cleanup. The cap 2 is disposed on top of the column 1 and has an entrance 220. A sample solution may enter from the entrance 220 of the cap 2 into the column 2, pass through the materials 3 for extraction and cleanup, and finally exit the outlet 110 to form a cleaned extract containing pesticide residues or veterinary drug residues ready for analysis by liquid chromatography-mass spectrometry (LC-MS) or gas chromatography-mass spectrometry (GC-MS). It is noted that the sample solution may be prepared in a method as disclosed in U.S. Pat. No. 9,581,579. The extraction and cleanup materials 3 generally include an upper powder layer 31 and an lower powder layer 32, both of which are clearly disclosed in that patent as well, and will not be discussed further here. Preferably, one or more filters 30 may also be included in the column 1 for filtration.

As shown in FIG. 3, the column 1 has at its top an opening 100 communicating with the interior space 10 of the column 1, a flange 15 surrounding the opening 10, and an enclosing wall 16 formed along the flange 15 and extending upward. Moreover, the column 1 has at its bottom an lower tube 11 communicating with the interior space 10 and a coupling pipe 12 surrounding the lower tube 11. The lower tube 11 has the outlet 110 at its bottom, and projects outside the coupling pipe 12. An annular gap 13 is formed in between the lower tube 11 and the coupling pipe 12.

The coupling pipe 12 of the column 1 has an inner wall formed with an connecting portion 14. The connecting portion 14 is configured for coupling with a cap of another quick extraction kit or with other products equipped with similar structures. In this embodiment, the connecting portion 14 is directed to an internal thread, such as a single-start thread or a multi-start thread. Preferably, the connecting portion 14 is a double-start thread. The column 1 may further include a plurality of ribs 17 at a bottom of the interior space 10. The ribs 17 are arranged in a circle surrounding an entryway 111 of the lower tube 11.

As best seen in FIG. 1, the cap 2 is formed in one piece and includes a base plate 21, an upper tube 22 extending upward from a top surface of the base plate 21, a pair of reinforcing ribs 25 formed on the base plate 21, and an annular cylindrical portion 23 (FIG. 2) extending downward from a bottom surface of the base plate 21.

More specifically, as shown in FIG. 2, the base plate 21 of the cap 2 lies within the enclosing wall 16 of the column 1 for covering the opening 100 of the column 1. The upper tube 22 of the cap 2 is in communication with the interior space 10 of the column 1 and has an inlet 220. As shown in FIGS. 1 and 3, the reinforcing ribs 25 are arranged at opposite sides of the upper tube 22. Each of the reinforcing ribs 25 has a bottom surface bonded to the top surface of the base plate 21, and an inner side surface adjacent to the bottom surface. The inner side surface of the reinforcing rib 25 is bonded to a peripheral side surface of the upper tube 22. The annular cylindrical portion 23 is configured to be fit in the opening 100 of the column 2, as depicted in FIG. 2.

Figure 4:
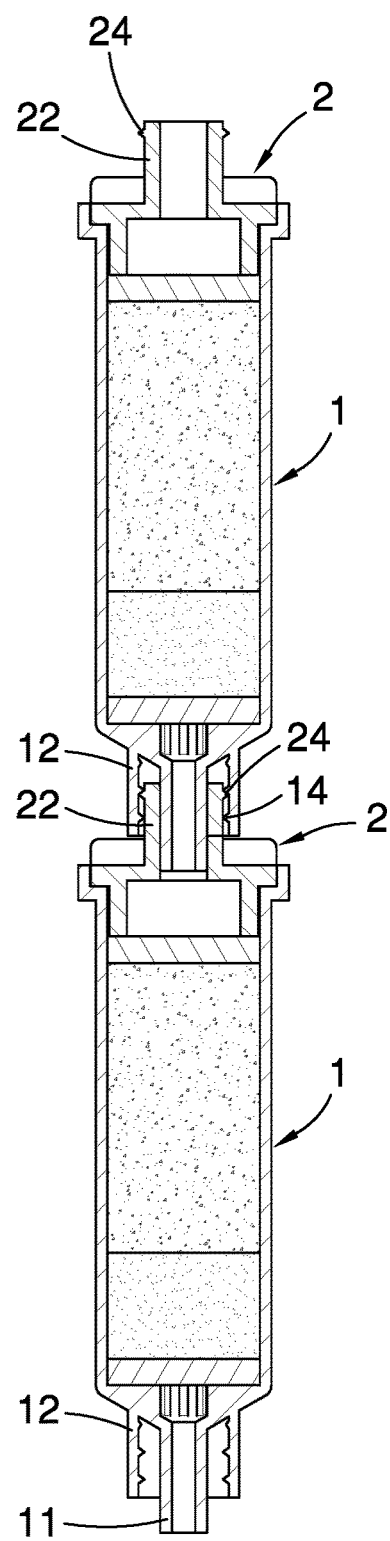
FIG. 4 is a cross-sectional view of the quick extraction kit connected with an identical quick extraction kit in series.

The upper tube 22 of the cap 2 has an outer wall formed with an connecting portion 24 defining the aforementioned entrance 220. The connecting portion 24 of the upper tube 22 of the cap 2 is configured in shape and size to match the connecting portion 14 of the coupling pipe 12 of the column 1. In this manner, the upper tube 22 of the quick extraction kit can be engaged with a coupling pipe 12 of another identical quick extraction kit, as depicted in FIG. 4. In this embodiment, the connecting portion 24 of the upper tube 22 of the cap 2 is directed to an external thread, such as a single-start thread or a multi-start thread, so as to be engaged with the internal thread or connecting portion 14 of the coupling pipe 12 of the another quick extraction kit or other similar structures.

Referring back to FIG. 3, the base plate 21 of the cap 2 is formed with an downward, annular protrusion 211 on a bottom thereof; and the flange 15 of the column 1 is formed with an upward, annular protrusion 151 on a top thereof, close to the opening 100 of the column 1. After a spin welding process, the annular protrusion 211 of the cap 2 and the annular protrusion 151 of the column 1 are weld together to form a sealing joint (not shown). It is understood that the sealing joint is located in between the bottom surface of the base plate 21 of the cap 2 and the top surface of the flange 15 of the column 1.

As described above, the quick extraction kit of the present invention has an excellent leak proof construction between the column 1 and the cap 2. Besides, the cap 2 is durable and can be secured on the column 1, without falling off easily.

It should be evident that this disclosure is by way of example and that various changes may be made by adding, modifying or eliminating details without departing from the fair scope of the teaching contained in this disclosure.

What is claimed is:

1. A quick extraction kit comprising:
   a column having an interior space to be filled with materials for extraction and cleanup, the column further having at its top an opening communicating with the interior space and a flange surrounding the opening, and at its bottom an lower tube communicating with the interior space, the lower tube having an outlet at its bottom; and
   a cap having a base plate for covering the opening of the column, an upper tube extending upward from a top surface of the base plate, and a pair of reinforcing ribs formed on the base plate and at opposite sides of the upper tube, wherein the base plate of the cap and the flange of the column together creates a sealing joint therebetween by spin welding; the upper tube of the cap is in communication with the interior space of the column and has an inlet; and each of the reinforcing ribs has a bottom surface bonded with the top surface of the base plate, and an inner side surface adjacent to the bottom surface and bonded with a peripheral side surface of the upper tube.

2. The quick extraction kit as recited in claim 1, wherein the upper tube of the cap has a connecting portion; the column further includes at its bottom a coupling pipe surrounding the lower tube; the coupling pipe has an inner wall formed with an connecting portion; the inner wall of the coupling pipe and an outer wall of the lower tube together define an annular gap therebetween; and the connecting portion of the upper tube of the cap is configured in shape and size to match the connecting portion of the coupling pipe of the column in order to be engaged with a column of another quick extraction kit.

3. The quick extraction kit as recited in claim 2, wherein the column further includes a plurality of ribs at a bottom of the interior space and arranged in a circle surrounding an entrance of the lower tube.

4. The quick extraction kit as recited in claim 3, wherein the lower tube of the column projecting outside the coupling pipe of the column.

5. The quick extraction kit as recited in claim 2, wherein the connecting portion of the upper tube of the cap is an external thread, and the connecting portion of the coupling pipe of the column is an internal thread for engagement with the external thread.

6. The quick extraction kit as recited in claim 5, wherein the cap further includes an annular cylindrical portion extending downward from a bottom surface of the base plate to be fit in the opening of the column.

7. The quick extraction kit as recited in claim 5, wherein the column further includes a plurality of ribs at a bottom of the interior space and arranged in a circle surrounding an entrance of the lower tube.

8. The quick extraction kit as recited in claim 7, wherein the lower tube of the column projecting outside the coupling pipe of the column.

9. The quick extraction kit as recited in claim 6, wherein the column further includes an enclosing wall formed along the flange, and the base plate of the cap lies within the enclosing wall of the column.

10. The quick extraction kit as recited in claim 6, wherein the column further includes a plurality of ribs at a bottom of the interior space and arranged in a circle surrounding an entrance of the lower tube.

11. The quick extraction kit as recited in claim 10, wherein the lower tube of the column projecting outside the coupling pipe of the column.

12. The quick extraction kit as recited in claim 9, wherein the column further includes a plurality of ribs at a bottom of the interior space and arranged in a circle surrounding an entrance of the lower tube.

13. The quick extraction kit as recited in claim 12, wherein the lower tube of the column projecting outside the coupling pipe of the column.

14. The quick extraction kit as recited in claim 1, wherein the column further includes a plurality of ribs at a bottom of the interior space and arranged in a circle surrounding an entrance of the lower tube.

15. The quick extraction kit as recited in claim 14, wherein the lower tube of the column projecting outside the coupling pipe of the column.

\* \* \* \* \*